United States Patent [19]

Horner

[11] 4,203,186
[45] May 20, 1980

[54] HEAT TRANSFER

[75] Inventor: Ian M. Horner, Southampton, England

[73] Assignee: Exxon Research & Engineering Co., Florham Park, N.J.

[21] Appl. No.: 929,807

[22] Filed: Jul. 31, 1978

Related U.S. Application Data

[62] Division of Ser. No. 657,571, Feb. 12, 1976, Pat. No. 4,123,837.

[30] Foreign Application Priority Data

Feb. 7, 1975 [GB] United Kingdom ................ 5305/75

[51] Int. Cl.$^2$ ..................... B21D 53/00; B21K 29/00; B23P 15/26
[52] U.S. Cl. ............................... 29/157.3 R; 29/458; 29/460; 165/164; 219/301; 219/535; 264/261
[58] Field of Search ................. 29/157.3 R, 458, 460, 29/611; 219/301, 535; 165/164; 264/261, 263

[56] References Cited

U.S. PATENT DOCUMENTS

| | | | |
|---|---|---|---|
| 2,982,992 | 5/1961 | Brown et al. | 219/301 UX |
| 3,331,946 | 7/1967 | Bilbro | 219/301 X |
| 3,718,804 | 2/1973 | Ando | 219/301 |
| 3,834,458 | 9/1974 | Bilbro et al. | 219/301 X |
| 3,972,821 | 8/1976 | Weidenbenner | 219/301 X |
| 4,031,611 | 6/1977 | Johnson | 29/611 |

Primary Examiner—Charlie T. Moon

Attorney, Agent, or Firm—F. Donald Paris

[57] ABSTRACT

A method of enhancing heat transfer between a heating or cooling element (such as a steam tracer heating line) and a conduit or vessel, comprising emplacing heat transfer material (such as a heat transfer cement) in a mouldable or plastic state between and in contact with the element and at least part of the adjacent surface of the conduit or vessel, and around and in contact with the element so that the element is surrounded by heat transfer material which contacts the element and applying a relatively rigid recessed retaining member such as a channel of "U" or "V"-shaped cross-section round the heat transfer material so that edges of the retaining member substantially abut the conduit or vessel and maintain coherence in the heat transfer material enclosed in the volume defined between the retaining member and the conduit or vessel and securing the retaining member and conduit or vessel relative to each other to maintain said coherence. Alternatively, the heat transfer element may be pressed towards the surface of the conduit or vessel into previously emplaced heat transfer material and any exposed surface of the element is surrounded by heat transfer material and the recessed retaining member applied around the heat transfer material with its edges against the conduit or vessel so that when the retaining member is secured relative to the conduit or vessel, heat transfer material is retained in good heat transfer relationship between the element and the conduit or vessel.

1 Claim, 5 Drawing Figures

RETAINING STRAPS

HEAT TRANSFER

This is a division of application Ser. No. 657,571, filed Feb. 12, 1976 now U.S. Pat. No. 4,123,837, issued Nov. 7, 1978.

The present invention relates to heat transfer and more particularly, to transferring heat to or from conduits and vessels.

It is often required to transfer heat to or from conduits and vessels from the outside thereof. Among the previous practices to achieve this, a heating or cooling element is located adjacent to the conduit or vessel, and the resistance to heat transfer is reduced by bringing the element into contact with the wall of the conduit or vessel (or as near as is possible, in the circumstances). The heat transfer efficiency is improved by the provision of a heat transfer material connecting the element and the conduit or vessel. Suitable heat transfer materials are well-known and among these are heat transfer materials comprising heat conductive particles of metal, graphite etc. in a mouldable plastic or mastic-like matrix which usually cures or hardens after a time. These mouldable heat transfer materials are commonly referred to as "heat transfer cements" and among the many heat transfer cements which are commercially available are those commercially available under the trade names "Konduct", obtainable from John L. Lord & Son Ltd. of Bury, Lancashire, England, "Thermon", obtainable from Thermon Manufacturing Company of Texas, U.S.A. and "Thermfas" obtainable from Atlas Preservative Co. Ltd., of Erith, Kent, England and Benjamin Foster Company of U.S.A.

The efficiency of heat transfer through the heat transfer material between the heating or cooling element and the conduit or vessel depends on the maintenance of contact of the heat transfer material with the element and the conduit or vessel, and continuity within the mass of heat transfer material.

According to a previous proposal described in U.S. Pat. No. 2,982,992, heat transfer material in a mouldable or plastic state is applied by a suitable mechanical applicator on and/or around the heating (or cooling) element and in contact with the outer surface or wall of the conduit or vessel. A drawback of this proposal is that the contact of the heat transfer material with the element, on the one hand, and with the vessel or conduit on the other hand, often tends to be reduced due to the relative thermal expansion or contraction of the element and/or vessel or conduit, during use, and to the related risk of void formation in the mass of heat transfer material and between the heat transfer material and the surfaces of the element and/or the conduit or vessel whereby the heat transfer efficiency between the element and the vessel or conduit is reduced. Time consuming and expensive expedients to improve the maintenance of contact with, or bonding of, the heat transfer material may be employed (e.g. wire brushing, degreasing, sandblasting or other surface preparation techniques either alone or in combination), but these do not sufficiently ensure that the drawbacks mentioned above are avoided or mitigated.

According to another proposal described in U.S. patent specification 3331946 and U.K. Pat. No. 1,108,673, a relatively rigid channel-shaped member (i.e. a recessed member which may be generally U-shaped or V-shaped in cross-section) is filled with heat transfer material in a mouldable or plastic state, and the filled channel is applied to the surface of the conduit or vessel in such fashion that the heating or cooling element is between the channel and the conduit or vessel. Although the channel tends to retain the heat transfer material in the space between the conduit or vessel and the channel, the heat transfer material may not contact or be fully in contact with, and against, the heating or cooling element and/or the vessel or conduit, and there may be unfilled voids and/or gaps between the element and the heat transfer material and/or between the vessel or conduit and the heat transfer material particularly when none, or not all, of the surface of the heating or cooling element contacts the adjacent surface of the conduit or vessel (e.g. when there is a gap between the element and the conduit or vessel as is sometimes the case when the element is a steam tracer line for transferring heat to a conduit, particularly at bends in the conduit). Thus, in a relatively common type of situation, voids and/or gaps tend to be formed in the heat transfer material at least between the heating or cooling element and the vessel or conduit, thereby reducing the efficiency of heat transfer.

The drawbacks of the prior art adverted to above are exacerbated when the heating or cooling element is not on the top of the conduit or vessel, since difficulties are experienced in maintaining the heat transfer material in the required position contacting both the element and the conduit or vessel. This problem is particularly acute when the element is underneath or on a vertical or overhanging surface of the conduit or vessel as in these circumstances, there is nothing to prevent the heat transfer material becoming detached, under its weight, from the vertical or overhanging or bottom surface which it ought to contact. The proposals of the prior art also lead to void formation in the many practical instances in which there is a space or gap between the element and the conduit or vessel since there is no way of ensuring that heat transfer material is emplaced in and/or retained in such a space or gap. In the best circumstances, a heat transfer element such as a steam tracer line disposed on the top of a conduit or vessel has contact only by its lowest point with the surface of the conduit or vessel and it is difficult to ensure that heat transfer material enters the region between the top of the conduit or vessel and the underside of the element on each side of the lowest point of the element. Moreover, in many circumstances, it is either impossible or uneconomic when using the techniques of the prior art to ensure that the element is in physical contact with the conduit or vessel at all points and the difficulties of emplacing heat transfer material in the gap between the adjacent regions of the element and the conduit or vessel are thereby increased.

In another prior art proposal, described in U.S. Pat. No. 3,224,501, heat transfer material is applied to the outer vertical walls of a vessel which is to be heated and a heatable panel is pressed into contact with the heat transfer material so as to sandwich the latter between the vessel and the panel. Drawbacks of this proposal are that air tends to be trapped between the panel and the material and that only that part of the panel which contacts or faces the material is available for heat transfer, the other parts being unavailable for heat transfer. These two drawbacks increase the size of panel necessary for a required amount of heat transfer, and the surface which is unavailable for heat transfer to the vessel is available to dissipate heat outwardly away from the vessel.

It is an object of the present invention to provide a simple, reliable and cheap method of utilising a heat transfer material to enhance transfer heat between a heating or cooling element and a conduit or vessel which avoids the drawbacks of the prior art.

According to one aspect of the present invention, there is provided a method of enhancing heat transfer between a heating or cooling element and a conduit or vessel comprising emplacing heat transfer material in a mouldable or plastic state between and in contact with the element and at least an adjacent surface of the conduit or vessel and around and in contact with the element and the heat transfer material so that the element is surrounded by heat transfer material which contacts the element and applying a relatively rigid recessed retaining member round the heat transfer material so that edges of the retaining member substantially abut the conduit or vessel and maintain coherence in the heat transfer material enclosed and in the volume defined between the retaining member and the conduit or vessel and securing the retaining member and conduit or vessel relative to each other to maintain said coherence.

The heat transfer material may be emplaced manually (e.g. employing a trowel, spade or similar hand tool) at least in part and such manual emplacement may be performed at least between and in contact with the element and the adjacent surface of the conduit or vessel. Alternatively, or in addition, the heat transfer material may be emplaced mechanically (e.g. employing any suitable applicator which dispenses and/or applies the material when mechanical parts thereof are operated). For example, a hand- or power-operated applicator of the caulking gun type may be used.

At least a part of the heating or cooling element may be spaced apart from the adjacent surface of the vessel or conduit to define a gap therewith and the heating or cooling element may be in situ adjacent to the vessel or conduit before heat transfer material is emplaced.

In another aspect, the invention provides a method of enhancing heat transfer between a heating or cooling element and a conduit or vessel, comprising applying heat transfer material in a mouldable or plastic state on a surface of the conduit or vessel, pressing at least part of the heating or cooling element towards the said surface so that the said part of the element is embedded in the heat transfer material and the heat transfer material is continuous between at least a portion of the part of the element and the surface, applying heat transfer material in contact with and around the part of the element so that all the surface of the said part, other than any surface which contacts the conduit or vessel, is contacted and surrounded by heat transfer material and applying a relatively rigid recessed retaining member around the heat transfer material so that edges of the retaining member substantially abut the conduit or vessel and maintained coherence in the heat transfer material enclosed in the volume defined between the retaining member and the conduit or vessel and securing the retaining member and conduit or vessel relative to each other to maintain said coherence.

In performing the invention according to this other aspect, at least some heat transfer material may be applied manually, although it may be convenient in some instances to apply at least some material mechanically.

In a further aspect, the invention comprises a heat transfer installation when made by the methods described above, which installation may comprise a heating or cooling element contiguous with at least an adjacent surface of the vessel or conduit, substantially continuous, coherent, heat transfer material contacting and surrounding the surface of the said element other than any part of the surface which contacts the vessel or conduit and a relatively rigid, recessed retaining member surrounding the heat transfer material and having its edges substantially abutting the conduit or vessel, the member being secured relative to the conduit or vessel.

Thermal insulation is preferably provided or applied around the outer surface of the retaining member and will usually also be provided or applied around the exposed surface(s) of the conduit or vessel and any other surfaces which might promote undesirable heat exchange.

The recessed retaining member of the installation may have at least one baffle or other plate-like member extending across the recess to prevent movement of heat transfer material lengthwise of the retaining member or installation. The baffle may be attached to the vessel or conduit or to the retaining member and is particularly useful when the surface of the vessel or conduit against which the element is to lie is not horizontal.

The retaining member may be secured relative to the conduit or vessel by any suitable means such as clips, straps, stays "U"-bolts and like securing means, or by attachment to another like recessed retaining member.

After the retaining member has been secured relative to the conduit or vessel, it may be advantageous to have slight compression or compaction of the heat transfer material to avoid void formation and maintain its coherence. Such compression or compaction may be generated by deformation of the retaining member to reduce the volume between the member and the channel. Any excess of heat transfer material is preferably removed from outside the retaining member.

The invention reduces or substantially eliminates the risk of gap formation in the heat transfer material so as to provide uninterrupted heat transfer paths between the element and the conduit or vessel. Moreover, a relatively improved bond between the heat transfer material and the element and the conduit or vessel can be achieved and maintained.

In a common application of the invention, the aforesaid element may be a steam tracer line located adjacent to a conduit through a fluid is passed and for which it is desired that the fluid temperature should be maintained substantially uniform along the length of the conduit by heat conduction from the steam tracer line. Such applications are encountered in e.g. the beverage, food and chemical processing industries, petroleum refineries and in the marine and oil production and distribution fields.

The steam tracer line may have a diameter in the range of from 0.6 to 3.7 cms, preferably 1.2 to 1.8 cms, and the conduit may have a diameter of at least 7.5 cms, e.g. 25 cms.

Figure 1:
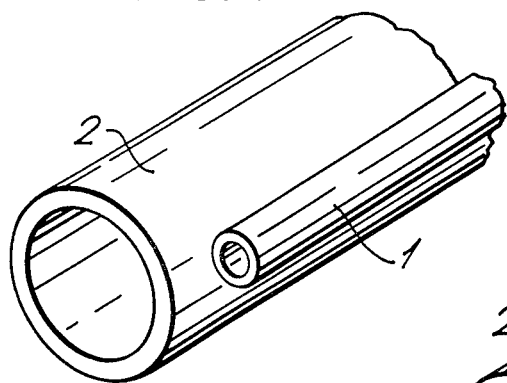
FIG. 1 shows a steam tracer line lying adjacent to a main fluid conduit.
Figure 2:
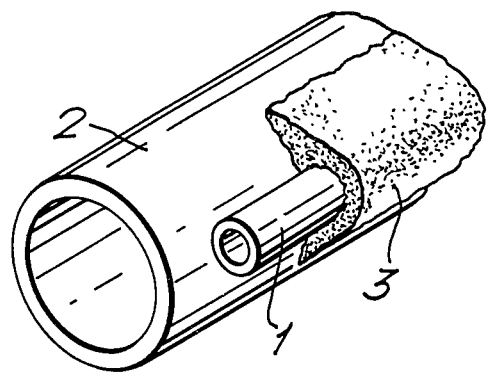
FIG. 2 depicts the line and conduit of FIG. 1 with an irregular mound of heat conductive material emplaced between the line and conduit and around the line.
Figure 3:
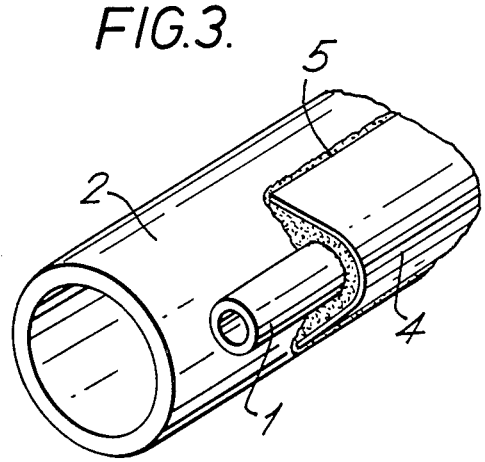
FIG. 3 shows the items of FIG. 4, but with a recessed retaining member about the convex outer face of the material and with its opposite edges firmly pressed against the surface of conduit.
Figure 4:
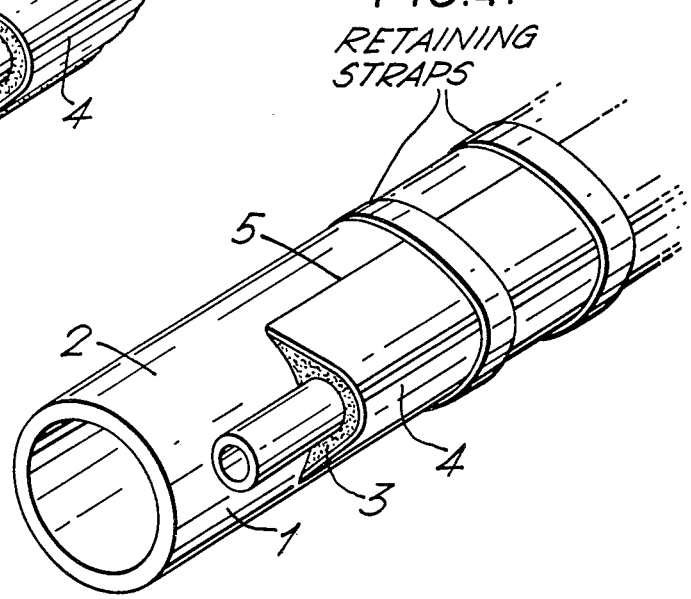
FIG. 4 shows the items of FIG. 3, but with the excess heat transfer material removed and the retaining member being retained in position by suitable retaining straps.
Figure 5:
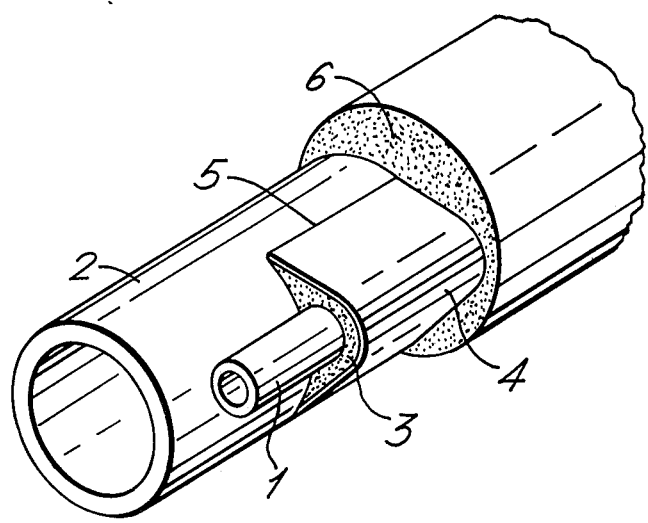
FIG. 5 illustrates the assembly of FIG. 4 with a layer of insulation therearound, the retaining straps being hidden thereby.

FIG. 3 of the accompanying drawing shows, by way of a nonlimitative embodiment a part-sectioned isometric view of a typical completed installation made by the method of this invention. The installation comprises a steam tracer line 1 of diameter 1.25 cms, a conduit or pipe 2 of diameter 11.6 cms through which liquid is passed at an elevated temperature and which temperature is maintained at least above a selected minimum temperature or at a substantially uniform temperature along the length of the pipe 2 by heat transfer from line 1, through heat transfer cement 3 which had been applied, e.g. manually around and in contact with the external surface of the steam tracer line 1 and between the line 1 and the adjacent surface of the pipe 2 while the line 1 was in situ relative to the pipe 2, a retaining channel 4 of mild steel, c 0.8 mms thick and about 1.3 cms wide which had been applied around the emplaced heat transfer cement 3, so as to enclose the previously cement-embedded steam tracer line 1, and to surround the cememt 3 with its edges 5 abutting on the surface of the pipe 2. The channel 4 was secured relative to the pipe 2 to retain the cement 3 in position, preferably under a slight compression or compaction force exerted via the channel 4 from the securing means FIG. 4. The securing means by which the channel 4 is attached or clamped to the pipe 2 well-known to those skilled in the art and may be straps, bands, wires, stays, clips "U"-bolts or like securing elements.

After securing the channel 4, the external surfaces of the channel 4 and pipe 2 were surrounded by thermal insulation 6. In the completed installation, the thickness of the heat transfer cement around the steam tracer line 1 was about 1.25 cms.

For economy in the use of the heat transfer cement, any excess outside the edges 5 of the channel 4 may be removed before the insulation is applied, although this is not essential.

In insulations having a vertical pipe 2, the channel 4 may have cross webs or plates (not shown) to prevent migration of the heat transfer cement.

It is preferred to use a heat transfer cement having a putty or dough-like consistency.

The invention is not limited to the illustrated embodiment and comprehends heat transfer from electrically heated elements to conduits and vessels and the cooling of conduits or vessels by a cooling element embedded in mutually contacting heat transfer material which, after application, is surrounded by a channel-shaped member. In certain circumstances, it may be desirable to employ means other than a channel shaped member to retain the heat transfer material in position and in contact with the element and conduit or vessel. Such means may be a suitably shaped retaining member. The invention is not limited to embodiments involving a single heating or cooling element and a single conduit or vessel.

What we claim is:

1. A method of enhancing heat transfer between a heating or cooling element and a conduit or vessel, comprising the following steps in sequence: applying heat transfer cement material in a mouldable state on a surface of the conduit or vessel; pressing at least part of the heating or cooling element towards the said surface so that the said part of the element is at least partly embedded in the heat transfer cement material and the heat transfer cement material is continuous between at least a portion of the part of the element and the surface; applying additional heat transfer cement material in contact with and around the part of the element so that all the surface of said part, other than any surface which contacts the conduit or vessel, is contacted and surrounded by heat transfer cement material; applying the relatively rigid recessed retaining member around the heat transfer cement material so that edges of the retaining member substantially abut the conduit or vessel whereby coherence takes place between said conduit or vessel, said heating or cooling element and said retaining member, and said member maintains said coherence and slight compression of the heat transfer cement material enclosed in the volume defined between the retaining member and the conduit or vessel; and securing the retaining member and conduit or vessel relative to each other to maintain said coherence and slight compression.

* * * * *